United States Patent [19]
Naylor, Jr.

[11] Patent Number: 5,801,854
[45] Date of Patent: Sep. 1, 1998

[54] COLOR CONVERSION METHOD

[75] Inventor: William Clark Naylor, Jr., Santa Clara, Calif.

[73] Assignee: Canon Information Systems Research Australia Pty Ltd, North Ryde, Australia

[21] Appl. No.: 601,069

[22] Filed: Feb. 12, 1996

[30] Foreign Application Priority Data

Feb. 14, 1995 [AU] Australia .................. PN1133

[51] Int. Cl.$^6$ .................................................. G03F 3/00
[52] U.S. Cl. ........................... 358/518; 358/520; 382/167
[58] Field of Search .......................... 364/526; 395/131; 382/162, 167; 358/504, 518, 519, 520, 521, 522, 523, 525

[56] References Cited

U.S. PATENT DOCUMENTS

| | | | |
|---|---|---|---|
| 4,843,379 | 6/1989 | Stansfield | 340/701 |
| 5,237,517 | 8/1993 | Harrington et al. | 364/526 |
| 5,510,910 | 4/1996 | Bockman et al. | 358/502 |

OTHER PUBLICATIONS

"Linear and Nonlinear Programming", Second Edition, 1984, pp. 238–259, 430, 431, 451, 452, David G. Luenberger, Addison–Wesley Publishing Co., Reading, Mass.

"Numerical Recipes in C, The Art of Scientific Computing", Press et al., pp. 414, 415 and 421, Cambridge University Press, 1992.

Primary Examiner—Emanuel Todd Voeltz
Assistant Examiner—Tony M. Cole
Attorney, Agent, or Firm—Fitzpatrick, Cella, Harper & Scinto

[57] ABSTRACT

A method of displaying color images, intended to be displayed on a first color display device, on a second color display device having a color gamut (2) different from a color gamut (1) of the first color display device. The method includes a first step of determining a plurality of input extrema color values (RGB), within the color gamut (1) of the first color display device and at the extrema of the gamut of the first color display. Next, the method determines a plurality of output extrema color values (R'G'B') corresponding to the input extrema color values (RGB), within the color gamut (2) of the second color display and at the extrema of the gamut (2) of the second color display. Then, the method determines a mapping for substantially all the values within the color gamut (1) of the first color display to substantially all the values within the gamut (2) of the second color display, the mapping substantially preserving the relative value of differences between color values relative to the extent of the gamut (1) of the first color space and differences between corresponding color values in the gamut (2) of the second color space relative to the extent of the gamut (2) of the second color space.

22 Claims, 7 Drawing Sheets

COLOR CONVERSION METHOD

FIELD OF THE INVENTION

The present invention relates to methods for converting from one colour space to another colour space and to a printing process whereby output is printed on a device having a limited or restricted gamut of colours.

BACKGROUND ART

Each printing device for the printing of colour images has a measurable gamut or range of colours which it is able to reproduce from any primary colours that it may utilise. This gamut varies from output device to output device, in addition to some variation between output devices of the same kind.

Colour images are often stored and printed in different colour spaces. For example, colour images displayed on a CRT-type device are normally stored in a Red, Green and Blue (RGB) format. This corresponds to the relevant primary colours (RGB) utilised in most CRT-type displays. Colour printing devices normally work in a subtractive colour space that comprises the Cyan, Magenta, Yellow (CMY) or Cyan, Magenta, Yellow and black (CMYK) colour spaces. Methods for conversion from one colour space to another are well known, with common methods utilising a sparse lookup table and interpolation between data points.

The CIE co-ordinate system defines three standard primaries (X, Y and Z) that represent the amount of spectral energy of a particular colour. Instruments, called colourimeters, measure the tri-stimulus values of X, Y and Z. Methods are know for mathematically transforming from RGB space or CMYK space to XYZ space and vice versa.

Unfortunately, these methods often require multiple table lookups, in addition to multiplication operations that are required to be performed as part of the interpolation process. Therefore, if it is desired to perform the conversion process within a standard microcomputer system it is likely that these known methods will take an unacceptably long time to complete the colour conversion process of a whole image.

Additionally, as previously mentioned, each output device has its own range or gamut of possible colours that it may print. Therefore, even if the colour conversion process has been carried out from one colour space to another, there is no guarantee that the colour derived in the second colour space will fall within the gamut of the output device. Further processing will be necessary in order to map the unprintable colours to those which are within the gamut of the printing device.

On the one hand, if it is desired to faithfully reproduce an image, extra inks and unique printing processes must be employed. If the goal is to make a pleasing rather than exact reproduction, it has been found that it is unnecessary to reproduce the exact image colour. It is of some importance, however, to attempt to maintain the relative differences between different initial colours.

Referring now to FIG. 1, there is shown an example of a conventional CIE chromaticity diagram. The gamut area 1 represents the gamut output by a CRT-type display device. The gamut 2 could represent the gamut of colours printable on a paper printing device such as an ink jet printer.

It is therefore seen that there is a problem when it is desired to print out an image displayable on a CRT-type device on, say, an ink jet printing device. The ink jet printing device will be unable to print colours e.g. 3 which are outside of its gamut 2 but within the gamut 1 of the CRT-type device.

SUMMARY OF THE INVENTION

Colour images intended to be displayed on a first colour display device having a first colour gamut are displayed on a second colour display device having a second colour gamut which is different than the first colour gamut. First, a plurality of input extrema colour values (RGB) are determined within the first colour gamut and at the extrema of the first colour gamut of the first colour display device. Next, a plurality of output extrema colour values (R'G'B') are determined corresponding to the input extrema colour values (RGB) within the second colour gamut and at the extrema of the second colour gamut of the second colour display. A mapping is determined for substantially all the values within the first colour gamut to substantially all the values within the second colour gamut, with the relative value of difference between colour values relative to the extent of the first colour gamut and differences between corresponding colour values of the second colour gamut relative to the extent of the second colour gamut being preserved. The mapping includes determining colour correction function mapping values within the second colour gamut to color gamut values of the second color gamut. The color correction function includes a number of free parameters, the values of which are determined by measurement of output colour values of the second colour display device using a colourimeter. The measurement may be made in an alternative colour space and converted to the colour space of the second colour gamut of the second colour display device, with the conversion utilizing a predetermined number of the output extrema values to determine the conversion. The conversion may include utilizing a barrier function to ensure that the converted measurements are within the second colour gamut of the second colour display device.

BRIEF DESCRIPTION OF THE DRAWINGS

A preferred embodiment of the present invention is described below with reference to the accompanying drawings in which.

DETAILED DESCRIPTION OF THE PREFERRED EMBODIMENT

In the preferred embodiment of the present invention, an attempt is made to preserve the relative colour differences between any two absolute colours at the expense of a remapping of the colours to be printed.

Figure 1:
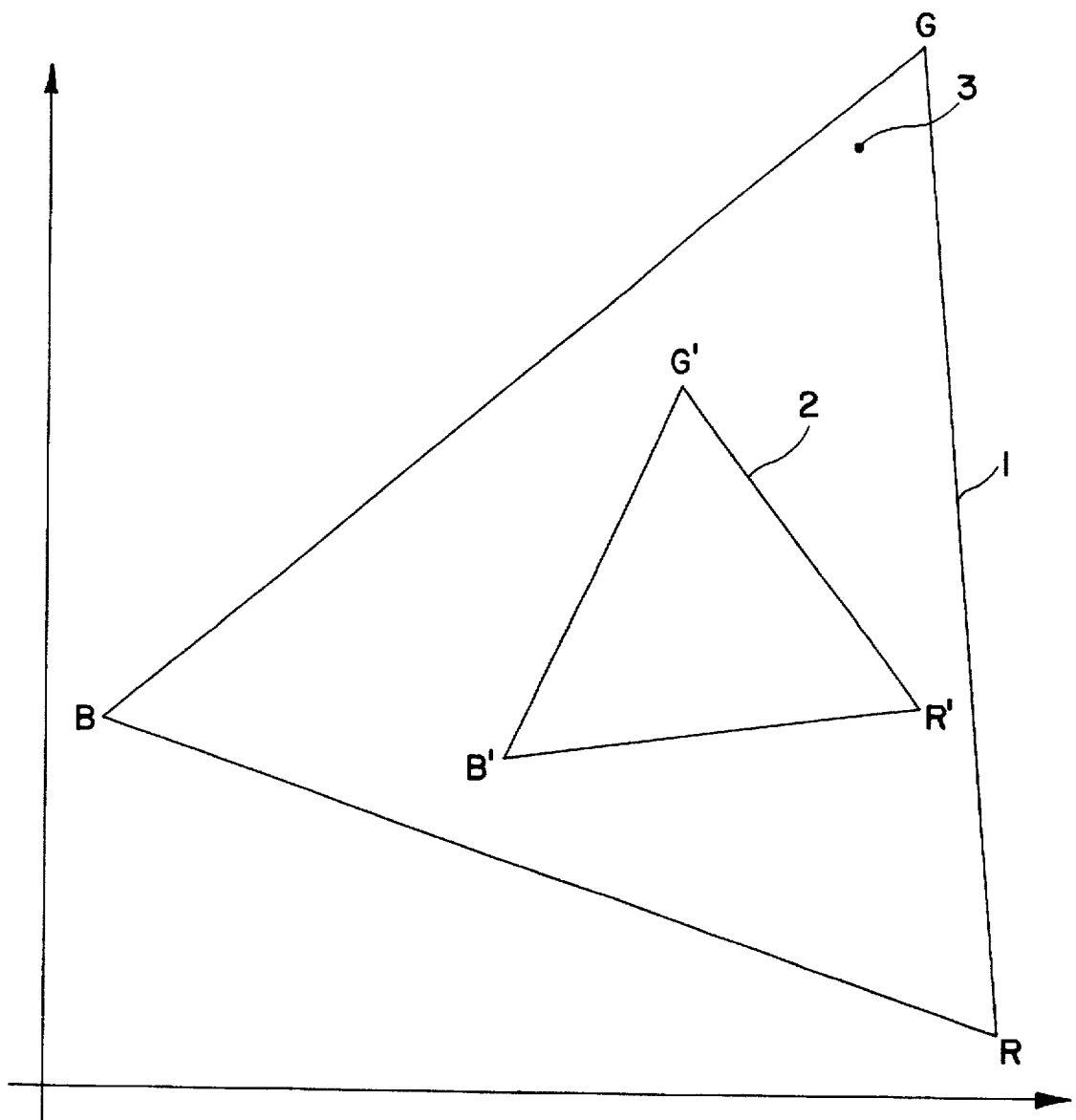
FIG. 1 illustrates the CIE gamut space of different output devices.
Figure 2:
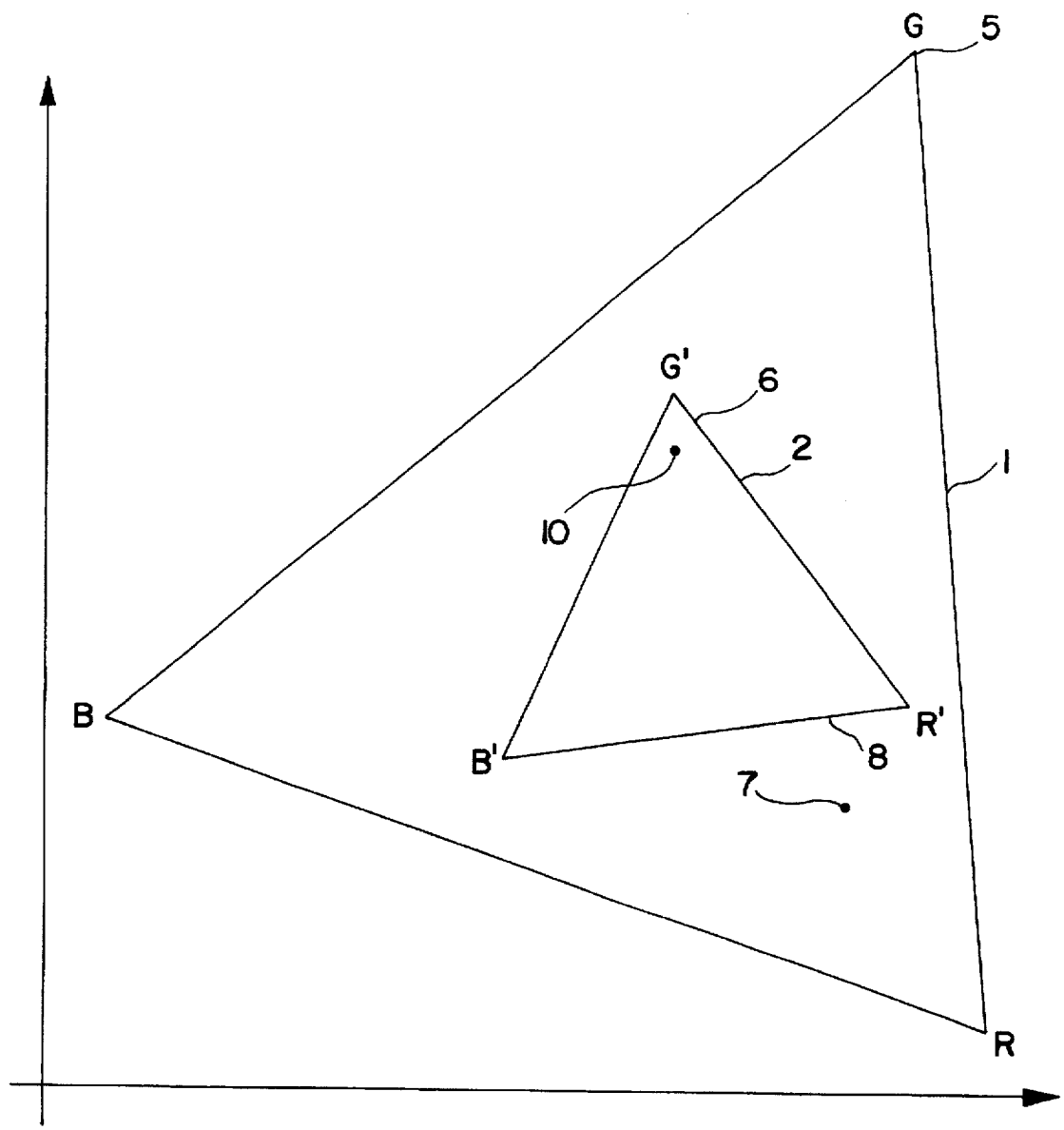
FIG. 2 is a CIE diagram illustrating a first method of mapping from one printer device colour space to a second printer device colour space.

Referring now to FIG. 2 there is shown a first method of mapping from the CRT type gamut 1 to the ink jet gamut space 2. In this method, points outside the ink jet gamut space 2 are mapped to the closest point on the surface of the gamut space 2. For example, the colour 5 which is within the coloured gamut 1 of the CRT type device is mapped to the colour 6 which lies on the edge of the gamut 2 of the ink jet printing device. Similarly, the colour 7 which is outside the ink jet printer gamut 2 is mapped to the colour 8, which is again on the edge of the gamut 2 of the ink jet type printing device. Those colours e.g. 10 which lie within the gamut space 2 of the ink jet type printing device are mapped to themselves and their values are not altered. The mapping of FIG. 2 is designed to optimise "absolute" colour accuracy. Those colours which are inside the ink jet colour gamut 2 are prefectly reproduced. Those outside the ink jet colour gamut are "clamped" to the nearest points on the boundary.

Figure 3:
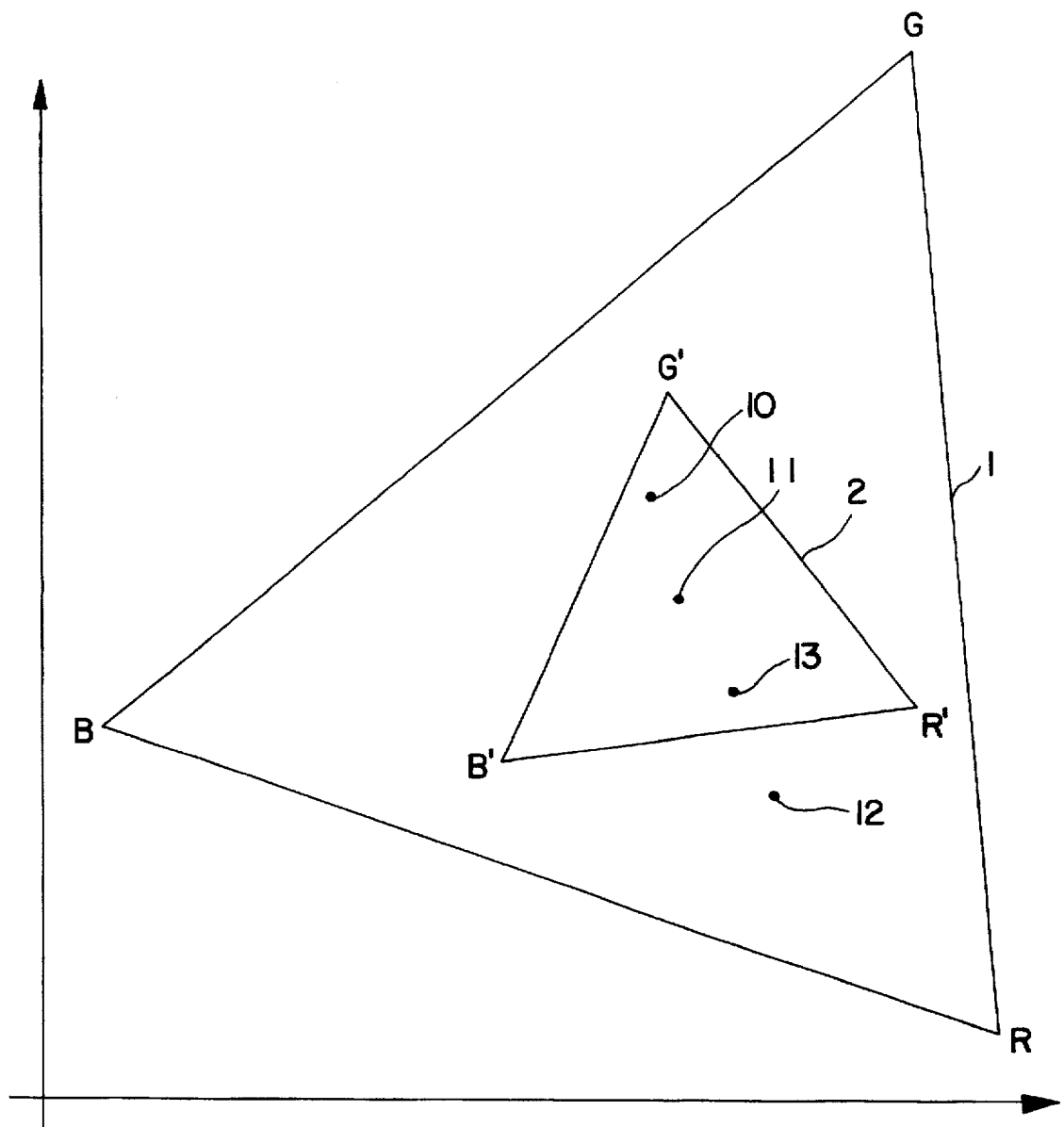
FIG. 3 is a CIE diagram showing a second method of mapping from one printer device colour space to a second printer device colour space.

Referring now to FIG. 3, there is shown the method of colour gamut matching utilised in the preferred embodiment where the strategy adopted is to optimise the mapping to make relative distances between different colours in the image remain the same. The Red R, Green G and Blue B "corners" of the CRT gamut 1 are mapped to the Red R', Green G' and Blue B' corners of the ink jet gamut 2. This mapping is carried out regardless of the absolute colour values of these corners. Those colours in the interior of the CRT gamut are mapped so as to preserve their relative differences from the R, G, and B corners as well as from each other. For example, in FIG. 3, the point G is mapped to the point G', the point B is mapped to the point B' and the point R is mapped to the point R'. Additionally, the point 10 is mapped approximately to the point 11 and the point 12 is mapped approximately to the point 13.

Figure 4:
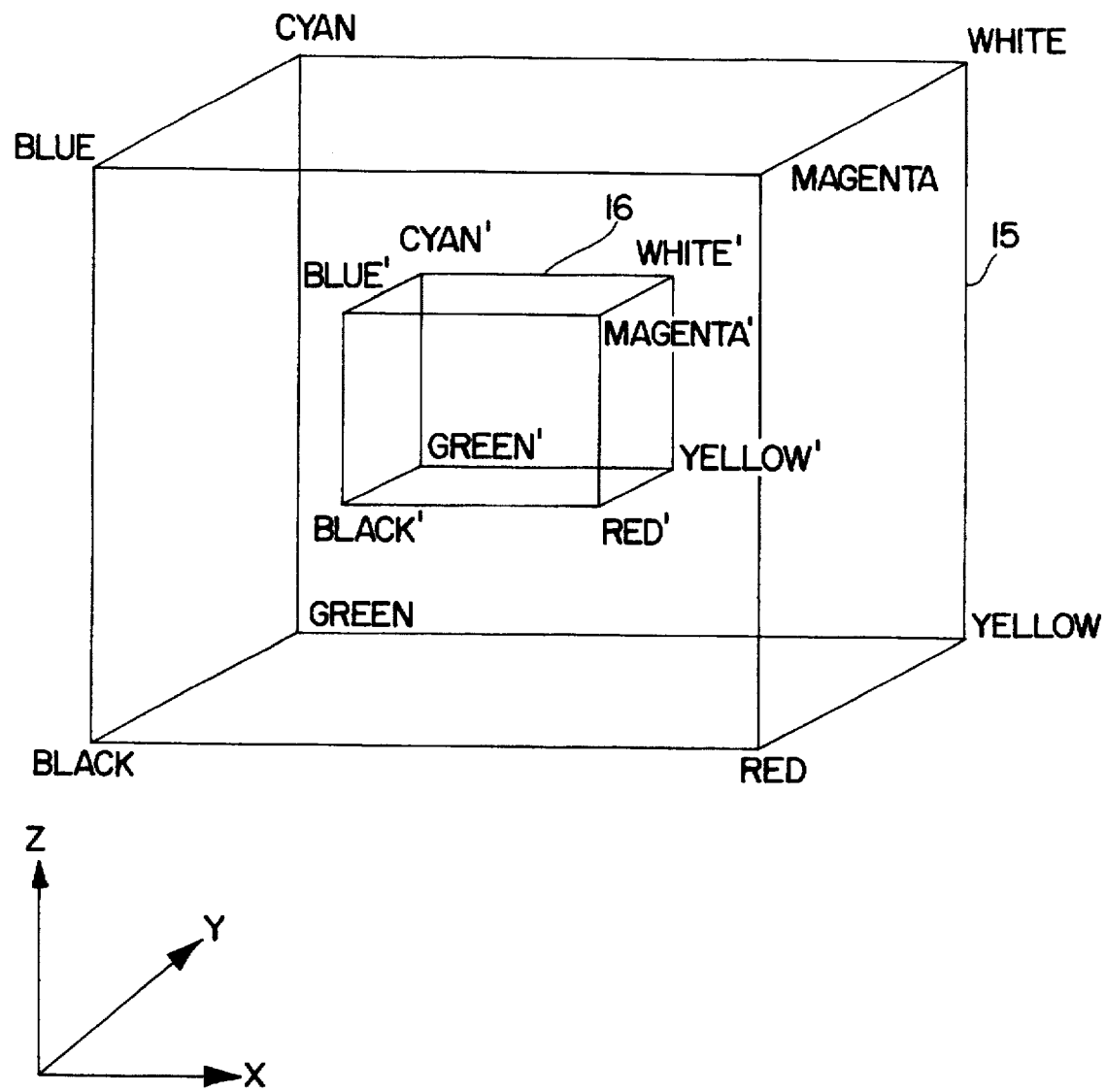
FIG. 4 illustrates, in three dimensions, the different colour spaces of various output devices.

Referring now to FIG. 4, there is shown the extension of the ideas of FIG. 3 into three dimensions in XYZ space. A first colour cube 15 represents the RGB colour cube of displayable colours by a CRT type device. Of course, it is evident to those skilled in the art, that colour "cube" 15 may not necessarily be an exact cube and can take the form of a parallelepiped or other volume.

Similarly, colour "cube" 16 represents those colours displayable by an ink jet printing device. Colour correction cube 16 can be "skewed" or "rotated" relative to colour correction cube 15.

The ink jet printing device normally relies on four colour inks, being Cyan, Magenta, Yellow and blacK (CYMK). the black portion of ink is normally obtained in accordance with the following equations:

$$K = \min(C, M, Y) \quad \text{Equation 1}$$

$$\begin{bmatrix} C \\ M \\ Y \end{bmatrix} = \begin{bmatrix} C' \\ M' \\ Y' \end{bmatrix} - \begin{bmatrix} K \\ K \\ K \end{bmatrix} \quad \text{Equation 2}$$

However, an ink jet printing device is normally a "binary" type device in that normally only two levels of output are possible for each primary colour output comprising either the presence or absence of ink. Therefore, the normal equations 1, 2 are modified to take into account the ink jet printer's binary nature such that if C, M and Y are all to be turned on they are replaced by K. This is expressed by the following pseudo code:

```
if((C == ON) && (M == ON) && (Y == ON))
{
    K <- ON;
    C <- OFF;
    M <- OFF;
    Y <- OFF;
}
else
{
    K <- OFF;
    /* leave CMY unchanged */
}
```

A number of assumptions are made in the implementation of the colour mapping of the preferred embodiment. Firstly, it is assumed that all points in the interior of both colour cubes are physically achieved by mixing various amounts of the corner colours and, secondly, that no point exterior to each cube is physically achieved by mixing colours from its corners. These assumptions are not often valid as measurements with a colourimeter can easily show that the assumptions are violated in practice. Therefore, methods will be discussed to allow the minimisation of errors caused by physical deviations from these theoretical assumptions.

Figure 7:
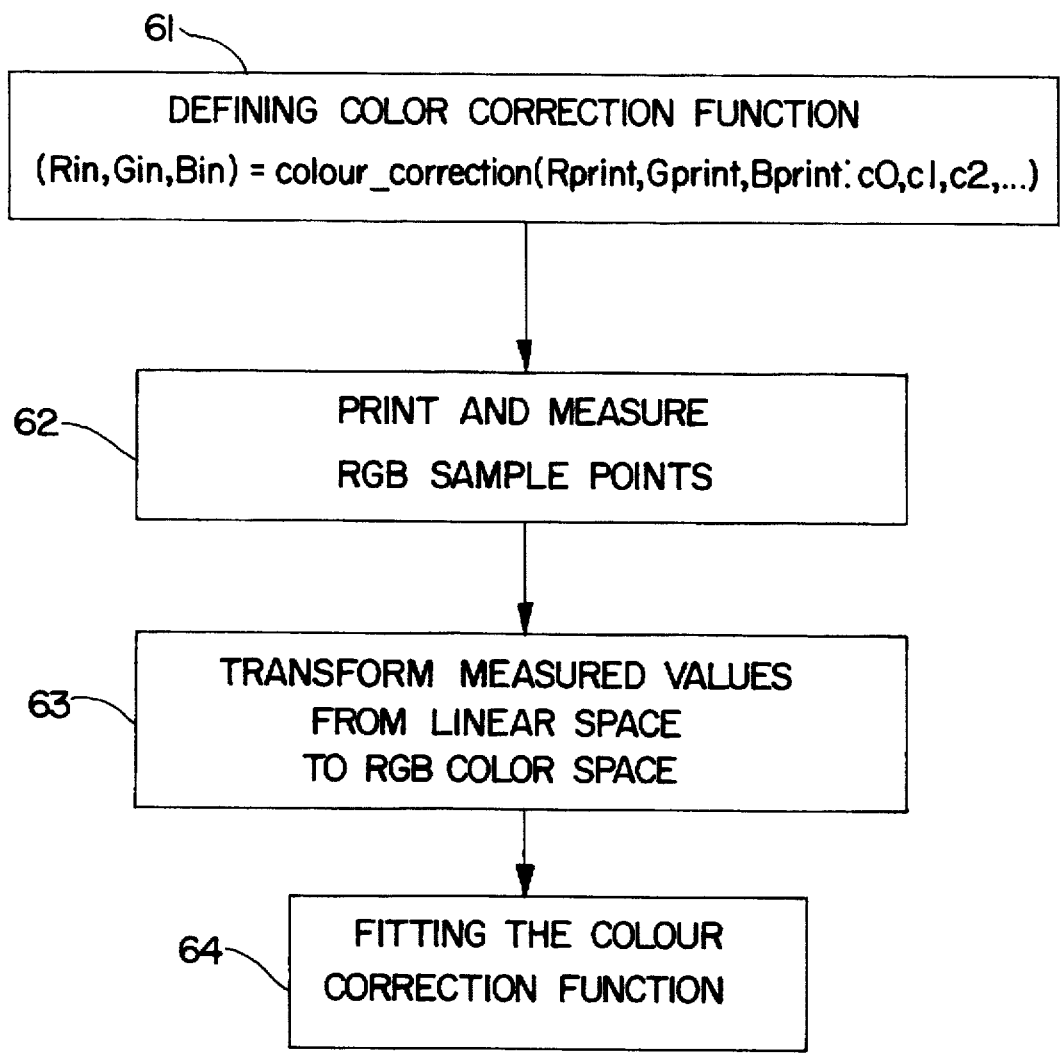
FIG. 7 is a flow chart indicative of processing colour images.

Further, it will be assumed that there is a one to one, non-linear mapping function which models the distortion caused by the half toning and/or printing by the ink jet printing device. As such a function exists, an inverse must also exist and this inverse is the colour correction function which is required. If such an inverse can be found, then, theoretically, it can be used to correct all the colour distortions of the ink jet printing device resulting in a printing system which will preserve relative colour. In practice, it is only possible to approximate this inverse function. The method of constructing an inverse approximation, as shown in FIG. 7 consists of the following four steps:

1. A functional form of the universe is assumed to exist (61, FIG. 7). This functional form will map the point (r,g,b) from the three dimensional RGB space of input values to points on a mathematically identical RGB space. The INPUT points to this function will represent the OUTPUT of the ink jet printer system. The OUTPUT points of this function will represent the INPUT to the ink jet printing system. It is further assumed that the eight corner points (FIG. 4) will map to themselves. The function will further have a number of free parameters, c0,c1,c2, . . . , which are set to optimise the fit between the function and measured experimental data. The function can therefore be written as:

$$(R_{in}, G_{in}, B_{in}) = \text{colour\_correction}(R_{print}, G_{print}, B_{print}; c0,c1,c2, \ldots) \quad \text{Equation 3}$$

where c0, c1 etc represent the free parameters, Rprint represents the red portion of the colour space value of the ink jet printer, and Rin presents the red portion of the value input to the ink jet system.

2. The various RGB colour sample points are printed utilising the target ink jet printing system and their corresponding colour values are measured using a colourimeter (62, FIG. 7). The points printed and measured should include the eight corners of the RGB colour cube 16 of FIG. 4. The measurements taken by the colourimeter can be utilised in fitting the colour correction function. One suitable method is to print out a 5×5×5 grid of equally spaced colour points in the input colour space of the ink jet printing system.

3. The sample points printed out are then measured in a linear colour space such as XYZ. If measurements are required to be formed in a non-linear form of colour space, such as CIE or Lab, the measured numbers must first be transformed into a linear space.

In order to fit the colour correction function (Equation 3), it is necessary to express these XYZ numbers as RGB coordinates (63, FIG. 7), and then fit the colour correction function (64, FIG. 7), as described in more detail later. As set out previously, it is assumed that the corner points of the colour cube 15 are mapped to the corner points of the RGB colour cube 16. The other printed colours are assigned coordinates in RGB space by comparing their measured colour values with the measured colours of the corners of the RGB cube 15.

The sample data points printed by the above process and measured by the colourimeter will consist of pairs of Rin, Gin, Bin input values and Xprint, Yprint, Zprint output values as follows:

$$(Rin, Gin, Bin)[i] \Leftrightarrow (Xprint, Yprint, Zprint)[i] \quad \text{Equation 4}$$

Of course, this assumes that the points are measured in a linear space such as XYZ, however, methods are known to transform from a nonlinear space such as CIE or Lab to XYZ.

In order to fit the colour correction function, the output colours must be expressed in RGB coordinates. Therefore, it is required that for all data points, the pairs as set out in Equation 4 be transformed into the following form:

$$(Rin, Gin, Bin)[i] \Leftrightarrow (Rprint, Gprint, Bprint)[i] \quad \text{Equation 5}$$

As mentioned previously, it is assumed that the corner points of colour cube 15 are correctly mapped to the corner points of colour cube 16. Thus, as a result of this assumption we have the following relationship:

$$(Rin = 0, Gin = 0, Bin = 0) \longleftrightarrow (Rprint = 0, Gprint = 0, Bprint = 0) \quad \text{Equation 6}$$

$$(Rin = 0, Gin = 0, Bin = 1) \longleftrightarrow (Rprint = 0, Gprint = 0, Bprint = 1)$$

$$(Rin = 0, Gin = 1, Bin = 0) \longleftrightarrow (Rprint = 0, Gprint = 1, Bprint = 0)$$

$$(Rin = 0, Gin = 1, Bin = 1) \longleftrightarrow (Rprint = 0, Gprint = 1, Bprint = 1)$$

$$(Rin = 1, Gin = 0, Bin = 0) \longleftrightarrow (Rprint = 1, Gprint = 0, Bprint = 0)$$

$$(Rin = 1, Gin = 0, Bin = 1) \longleftrightarrow (Rprint = 1, Gprint = 0, Bprint = 1)$$

$$(Rin = 1, Gin = 1, Bin = 0) \longleftrightarrow (Rprint = 1, Gprint = 1, Bprint = 0)$$

$$(Rin = 1, Gin = 1, Bin = 1) \longleftrightarrow (Rprint = 1, Gprint = 1, Bprint = 1)$$

As colourimeter measurements have been made of these corner points, the colourimeter measurements of the other measured sample points can be expressed as convex linear combinations of the above corner point measurements. The convex linear combination weightings or coefficients can then lead to an assignment of RGB print values to these measured points.

If the colourimeter measurements for the eight corner points are as follows:

$$(Xprint, Yprint, Zprint) [0,0,0]$$

$$(Xprint, Yprint, Zprint) [0,0,1]$$

$$(Xprint, Yprint, Zprint) [0,1,0]$$

$$(Xprint, Yprint, Zprint) [0,1,1]$$

$$(Xprint, Yprint, Zprint) [1,0,0]$$

$$(Xprint, Yprint, Zprint) [1,0,1]$$

$$(Xprint, Yprint, Zprint) [1,1,0]$$

$$(Xprint, Yprint, Zprint) [1,1,1] \quad \text{Equation 7}$$

and if the printed RGB gamut is assumed to be of a cubic nature, and the measurement space is assumed to be linear, it is possible to calculate the XYZ measurements for other RGB print values by the use of trilinear interpolation which can be determined as follows:

Equation 8

$$(Xpredict, Ypredict, Zpredict) = XYZpredict(Rprint, Gprint, Bprint) =$$

$$(1 - Rprint) * (1 - Gprint) * (1 - Bprint) * (Xprint, Yprint,$$

$$Zprint)[0, 0, 0] + (1 - Rprint) * (1 - Gprint) * Bprint * (Xprint, Yprint,$$

$$Zprint)[0, 0, 1] + (1 - Rprint) * Gprint * (1 - Bprint) * (Xprint, Yprint,$$

$$Zprint)[0, 1, 0] + (1 - Rprint) * Gprint * Bprint * (Xprint, Yprint,$$

$$Zprint)[0, 1, 1] + Rprint * (1 - Gprint) * (1 - Bprint) * (Xprint, Yprint,$$

$$Zprint)[1, 0, 0] + Rprint * (1 - Gprint) * Bprint * (Xprint, Yprint,$$

$$Zprint)[1, 0, 1] + Rprint * Gprint * (1 - Bprint) * (Xprint, Yprint,$$

$$Zprint)[1, 1, 0] + Rprint * Gprint * Bprint *$$

$$(Xprint, Yprint, Zprint)[1, 1, 1]$$

Since measurements have been taken for various (Xprint, Yprint, Zprint) it can be assumed that Equation 8 can be utilised to estimate values for the variable Rprint, Gprint, Bprint by minimisation of the error in the predicted (Xpredict, Ypredict, Zpredict) output value. The error between predicted and actual values can be expressed as an error function of the following form:

$$\text{error}(Rprint, Gprint, Bprint) = \|(Xprint, Yprint, Zprint) - XYZpredict(Rprint, Gprint, Bprint)\|^2 \quad \text{Equation 9}$$

Conjugate direction methods can then be utilised with respect to Equation 9 to choose (Rprint, Gprint, Bprint) so as to minimise the error over all the data samples. Conjugate direction methods are numerical methods utilised for minimising non-linear functions in multiple variables. Conjugate direction methods are well known to those skilled in the art of numerical analysis and appear in a number of standard texts. For example, reference is made to the text "Linear and Nonlinear Programming" by David G Luenberger, Second Edition, 1984, Addison-Wesley Publishing Company, Reading, Mass. and to the standard text "Numerical Recipies in C, The Art of Scientific Computing" by Press et al, published by Cambridge University Press 1992.

As the colour cube 16 is not a perfect cube and as a result of a number of the assumptions made, and because of noise in the measured data, the application of well known conjugate direction methods directly to the above formulas can yield values which are well outside the admissible range of colour cube 16. Simply moving these values to the closest points on colour cube 16 was found to not yield the best RGB values in the admissible range. A better method is to utilise a barrier function in the conjugate gradient direction method optimisation procedure. The utilisation of a barrier functions is more fully described in the above texts. The barrier function can be used to confine the RGB values to the admissible range during optimisation. A barrier function of the following form is suitable:

$$\text{barrier}(x) = \text{if}(x<0)$$
$$\text{result} = 0$$
$$\text{if}(0 \leq x < 1)$$
$$\text{result} = \frac{1}{1-x^2} - 1$$
$$\text{if}(x \geq 1)$$
$$\text{result} = +\infty$$

Equation 10

Figure 5:
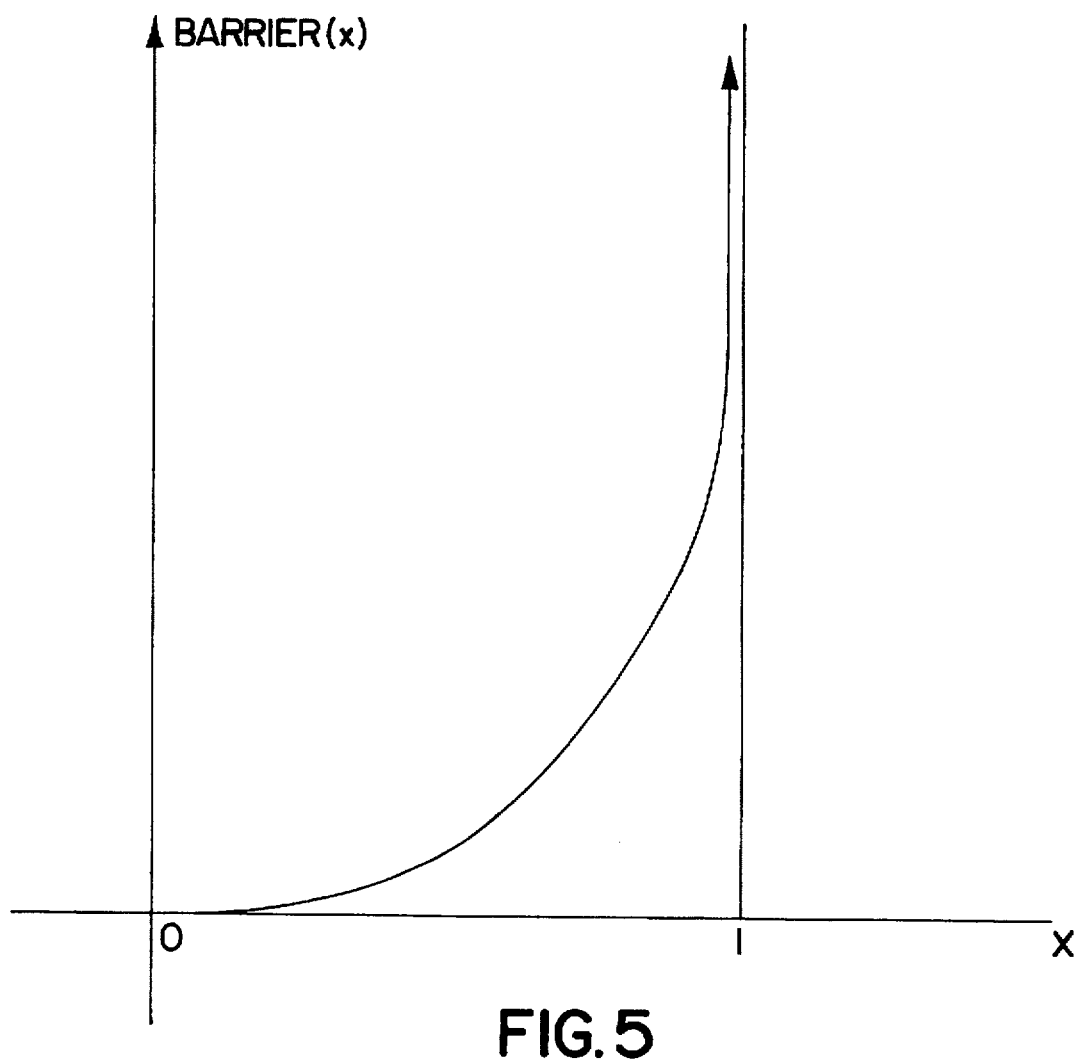
FIG. 5 illustrates a barrier function used in the numerical optimisation procedure utilised in the preferred embodiment.

The barrier function takes the form as shown in FIG. 5 with an asymptotic value of plus infinity at x=1.

By adding the barrier function to the error objective, the objective function is caused to go to positive infinity for small deviations outside the admissible colour range. The new objective function is therefore:

$$\text{objective}(Rprint, Gprint, Bprint) =$$

Equation 11

$$\text{error}(Rprint, Gprint, Bprint) +$$

$$\text{barrier}(s \cdot (Rprint - 1)) + \text{barrier}(-s \cdot Rprint) +$$

$$\text{barrier}(s \cdot (Gprint - 1)) + \text{barrier}(-s \cdot Gprint) +$$

$$\text{barrier}(s \cdot (Bprint - 1)) + \text{barrier}(-s \cdot Bprint)$$

wherein "s" is a scaling factor which determines how far outside the admissible colour range the solution values are allowed.

Setting s to positive infinity will, in theory, prevent any deviation from the admissible range. However, this also has the known effect of driving the condition number of the corresponding Hessian of the optimisation problem to infinity, which will dramatically slow or stop convergence of the conjugate direction methods. Experiment has found that a value of s=300 is a good compromise value to use.

The object of equation 9 is easily minimised using a conjugate direction method. In the present case, Powell's conjugate direction method was found to be adequate to optimise equation 11. The optimisation is performed for every measured sample point, to give a (Rprint, Gprint, Bprint) vector. These vector values are then used to fit the colour correction function.

4. Fitting the Colour Correction Function

The fitting of the colour correction function (64, FIG. 7) to the measured data is a nonlinear process and, as such, a nonlinear fitting method must be utilised. To fit the colour correction function, an error function is again constructed, however this error function measures the average deviation of predicted data from the measured data. Conjugate direction methods can then be used on this error function in order to find its minimum. The error function utilised is a simple sum of the squares error function of the following form:

$$\text{error}(c0, c1, c2, \ldots) = \sum_{\text{all measured data points}} |(Rin_i, Gin_i, Bin_i) -$$

Equation 12

$$\text{colour\_correction}(Rprint_i, Gprint_i, Bprint_i; c0, c1, c2, \ldots)|^2$$

The free parameters $c_j$ of the above formula can be adjusted to give the minimum error using a conjugate direction method. The colour correction function maps points from the three dimensional RGB space $$0 \leq r \leq 1$$
$$0 \leq g \leq 1$$
$$0 \leq b \leq 1$$

Equation 13 to points in a mathematically identical RGB space. As noted previously, the INPUT points to the colour correction function represent the OUTPUT of the ink jet printing system, and the OUTPUT points of the colour correction function represent the INPUT to the ink jet printing system. It is further assumed that the eight corner points map to themselves. Further, as noted previously, the function has a number of free parameters $c_j$ which are required to be optimised.

The colour correction function is the inverse of a print distortion function which can be written in the following form:

$$(Rprint, Gprint, Bprint) = \text{print\_distortion}(Rin, Gin, Bin)$$

Equation 14

In the present embodiment, the form of the print distortion function is first derived and then inverted to obtain the colour correction function.

Several considerations enter into the choice of the colour correction function's actual form. These considerations include:

1. The function should be able to accurately approximate physical reality.
2. The function should be able to be efficiently programmed for incorporation into driver software for a microcomputer or the like so that an inordinate delay does not occur in the printing of images.
3. The function should have as few free parameters, $c_j$, as possible so that fewer measurements are needed to obtain a good fit to the sample data without overfitting occurring.

One popular colour correction function, utilised with CRT type devices, is the "gamma correction" function which takes the following form:

$$Rin = Rprint^{\frac{1}{\gamma_r}}$$

$$Gin = Gprint^{\frac{1}{\gamma_g}}$$

$$Bin = Bprint^{\frac{1}{\gamma_b}}$$

Equation 15

However, this function was found to provide poor quality results when applied to printing devices such as ink jet printers. This is most probably as a result of its intended purposes, which is in use for CRT type displays and hence there is no physical reason why it should produce good results for an ink jet printing system. A more thorough analysis can therefore be undertaken as to the physical operation of a printer such as an ink jet type printer. These physical principles of operation can then be used to construct a more suitable print distortion function which can then be inverted to provide the colour correction function.

Figure 6:
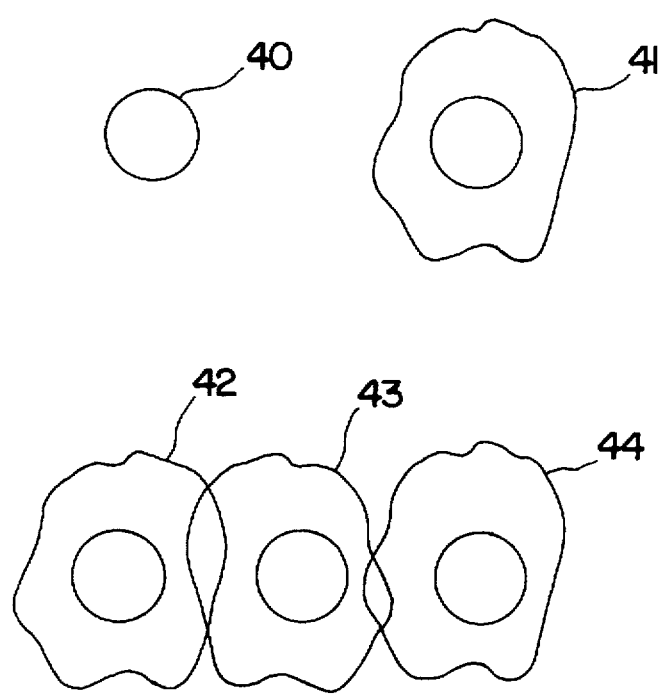
FIG. 6 illustrates the problem of "dot gain" experienced by printing devices.

The most significant distortion in devices such as ink jet printing devices is that caused by "dot gain". Ink jet printing devices, such as the Canon BJ600, work on the principal of ejection ink onto paper in the form of a large array of dots or pixels. Commonly, these devices can eject 300 or 400 dots per inch. Methods, commonly known as halftoning, are utilised so that the collation of the dots printed approximates a desired full coloured image. In a first, oversimplified representation, each dot can be considered uniform and modelled for example as a uniformed sized round dot 40 of FIG. 6. Unfortunately, in practice, when a single dot is ejected onto paper or the like, it is absorbed by the paper and "spreads out" such that it has a non-uniform boundary and each dot has a variation in size as shown by the dot 41 of FIG. 6. Also, when a series of dots 42–44 are printed close together, the moisture from a first dot 42 can effect subsequent dots e.g. 43 such that their combined area is again substantially increased. These problems are well known to those in the printing art, and fall under the general heading of "dot gain".

The problems of dot gain appear to be physically unavoidable and the amount of dot gain depends on the details of the arrangement of the dots on a page. A very simple and robust assumption is that the dots of ink are projected onto the page in a random distribution. The random distribution assumption leads to the following differential equation for the amount of colour produced by a given amount of ink ejected on a page:

$$\frac{dC}{1-C} = G dI \qquad \text{Equation 16}$$

In this equation C is the amount of colour, I is the amount of ink, and G is the amount that each dot "spreads out" when printed and can be considered a measure of the dot gain. This differential equation states that the fraction of uncoloured or uncovered paper which is coloured by a small amount of ink is given by the dot gain G. The differential equation of Equation 16 can be easily integrated to yield $$C = 1 - e^{-GI} \qquad \text{Equation 17}$$

with the boundary condition that C=0 when I=0. Equation 17 in its present form implies that the colour coverage never reaches 100%. Equation 17 can be renormalised such that colour coverage at I=1 is equal to 100%. This renormalisation takes the following form:

$$C = \frac{1 - e^{-GI}}{1 - e^{-G}} \qquad \text{Equation 18}$$

Thus Equation 18 represents a form of the print distortion function. In order to obtain the colour correction function, Equation 18 must be inverted. This inversion takes the following form:

$$I = \frac{-\ln(1 - (1 - e^{-G})C)}{G} \qquad \text{Equation 19}$$

Equation 19 applies only to one colour of ink. Ink jet printing devices, printing on, for examples white paper, utilise a "subtractive" colour printing process. One form of well known full colour subtractive colour printing process utilises three colours of ink, being Cyan, Magenta and Yellow with methods for transferring from one colour printing process to the other being well known.

The utilisation of three subtractive colour inks yields the following series of equations:

$$cyan_{in} = \frac{-\ln(1 - (1 - e^{-G}) cyan_{print})}{G} \qquad \text{Equation 20}$$

$$magenta_{in} = \frac{-\ln(1 - (1 - e^{-G}) magenta_{print})}{G}$$

$$yellow_{in} = \frac{-\ln(1 - (1 - e^{-G}) yellow_{print})}{G}$$

The cyan, magenta and yellow CMY values can be easily converted to and from corresponding RGB values utilising the following relationship.

$$\begin{bmatrix} C \\ M \\ Y \end{bmatrix} = \begin{bmatrix} 1 \\ 1 \\ 1 \end{bmatrix} - \begin{bmatrix} R \\ G \\ B \end{bmatrix} \qquad \text{Equation 21}$$

Reasonably good results are produced when utilizing Equation 20 as the colour correction function is free of the parameter G and the results produced were found to be reasonably good. Equation 20 has the advantage of being easy to fit using conjugate gradient methods as it only has one free parameter G. Further, it would be easy to implement in ink jet printer driver software. However, Equation 20 has a number of significant disadvantages. These include:

(i) The conversion of CMY to K is totally ignored in the above equations.

(ii) The dot gain is not constant but rather appears to be a function of the total amount of ink or moisture on the page. More ink on a page means that more moisture is present and this normally tends to change the tendency for a particular ink to interfuse into the paper. This unwanted effect tends to destroy the possibility of independently correcting for each colour.

These effects can be modelled by making the dot gain a function of the amount of ink on the page. The amount of ink on the page can be roughly modelled as follows:

$$k_{print} = \min(cyan_{print}, magenta_{print}, yellow_{print}) \qquad \text{Equation 22}$$

$$ink = (cyan_{print} - k_{print}) + (magenta_{print} - k_{print}) +$$

$$(yellow_{print} - k_{print}) + k_{print}$$

The functional form of the relationship between the dot gain G and the total amount of ink is not known. However, assuming that the functional form is reasonably well behaved, it will have a Taylor's series expansion of the following form:

$$G(ink) = g_0 + g_1 \cdot ink + g_2 \cdot ink^2 + \qquad \text{Equation 23}$$

where $g_0$, $g_1$ etc are unknown constants. This Taylor's series expansion can be truncated and the parameters fitted to the certain measured colourimeter data. Substantial improvement can result from using the second linear term, but no substantial improvement normally results from using higher order terms. Therefore, the Taylor's series expansion of Equation 23 is truncated to take the following form:

$$G(ink) = g_0 + g_1 \cdot ink \qquad \text{Equation 24}$$

The final form for the colour correction function is therefore:

$$(Rin, Gin, Bin) = \qquad \text{Equation 25}$$

colour_correction(Rprint, Gprint, Bprint; $g_0, g_1$)

Internals:

$cyan_{print} = 1 - Rprint$ $magenta_{print} = 1 - Gprint$ $yellow_{print} = 1 - Bprint$ $k_{print} = \min(cyan_{print}, magenta_{print}, yellow_{print})$ $ink = (cyan_{print} - k_{print}) + (magenta_{print} - k_{print}) +$ $(yellow_{print} - k_{print}) + k_{print}$ $G(ink) = g_0 + g_1 \cdot ink$ -continued $$cyan_{in} = single\_color\_correct(cyan_{print})$$
$$magenta_{in} = single\_color\_correct(magenta_{print})$$
$$yellow_{in} = single\_color\_correct(yellow_{print})$$

where $$single\_color\_correct(I) = \frac{-\ln(1 - (1 - e^{-G}) \cdot I)}{G}$$

$$R_{in} = 1 - Cyan_{in}$$
$$G_{in} = 1 - magenta_{in}$$
$$B_{in} = 1 - yellow_{in}$$

The above function is a reasonably simple one and has only two free parameters, $g_0$ and $g_1$. Fitting $g_0$ and $g_1$ to a set of 125 measured colourimeter values can be performed in reasonable computer time using Powell's conjugate direction method. Tests have shown that the results yield excellent colour reproduction on ink jet printing devices such as Canon Inc's BJ600. Different types of paper will produce different dot gains and hence lead to different values for $g_0$ and $g_1$.

The foregoing describes only one main embodiment of the present invention, with minor modifications. Further modifications obvious to those skilled in the art, can be made thereto without departing from the scope of the invention.

Appendix 1 sets out a C code program for performing the first Powell method optimisation, Appendix 2 sets out C code source for performing the second Powell optimisation, Appendix 3 sets out various non-standard library functions utilised by Appendix 1 and 2.

- 15 -

Appendix 1

```
    #include <stdio.h> include "wnlib.h"
    #include "wnswap.h"

#define NUM_DIVISIONS 5
    #define NUM_SAMPLES
    (NUM_DIVISIONS*NUM_DIVISIONS*NUM_DIVISIONS)

local double **in,**out;

    local double cube[2][2][2][3];

local void trilinear_interpolate(out_vect,in_vect)
    double out_vect[3],in_vect[3];

{
      int i1,i2,i3;
      double w1,w2,w3;

wn_zero_vect(out_vect,3);

for(i1=0;i1<2;++i1)
      {
        if(i1 == 1)
        {
          w1 = in_vect[0];
        }
        else
        {
          w1 = 1.0-in_vect[0];
        }
```

```
        for(i2=0;i2<2;++i2)
        {
         if(i2 == 1)
         {
          w2 = in_vect[1];
         }
         else
         {
          w2 = 1.0-in_vect[1];
         } for(i3=0;i3<2;++i3)
         {
          if(i3 == 1)
15        {
           w3 = in_vect[2];
          }
          else
          {
           w3 = 1.0-in_vect[2];
          } wn_add_scaled_vect(out_vect,cube[i1][i2][i3],w1*w2*w3,3);
         }
        }
       }
      }

     local void make_cube()
     {
      int i1,i2,i3,index;
      int r_i,g_i,b_i;

      for(i1=0;i1<2;++i1)
      for(i2=0;i2<2;++i2)
      for(i3=0;i3<2;++i3)
      {
       r_i = i2;
```

```
        g_i = i3;
        b_i = i1;

index = (NUM_DIVISIONS-1)*
                (NUM_DIVISIONS*NUM_DIVISIONS*b_i + NUM_DIVISIONS*r_i +
        g_i);

printf("(%d,%d,%d)= %d\n",i1,i2,i3,index);

        wn_copy_vect(cube[r_i][g_i][b_i],out[index],3);
        }
      }

    #define SCALE (300.0)

local double barrier_eval(vect)

    double vect[3];

{
      extern double barrier();
      int i;
      double sum;

sum = 0.0;

for(i=0;i<3;++i)
      {
        sum += barrier(-SCALE*vect[i]);
        sum += barrier(SCALE*(vect[i]-1.0));
      }

      return(sum);
    } local double *save_out_sample;
```

```
    local double function(vect)

    double vect[3];

{
      extern double wn_dist2();
      double actual[3],dist,bar;
      trilinear_interpolate(actual,vect);

dist = wn_dist2(actual,save_out_sample,3);
      bar = barrier_eval(vect);
      return(dist+bar);
    }

    local void bound_num(pn)

double *pn;

{
      if(*pn < 0.0)
      {
        *pn = 0.0;
      }
      else if(*pn > 1.0)
30    {
        *pn = 1.0;
      }
    }

35
    local void bound_out_sample(out_sample)

double out_sample[3];
```

- 19 -

```
     {
      int i;

for(i=0;i<3;++i)
 5    {
       bound_num(&(out_sample[i]));
      }
     }

     local void renormalize_sample(out_sample)

double out_sample[3];

     {
      int i;
      int code;
      double vect[3];
      double val;
      for(i=0;i<3;++i)
      {
       vect[i] = 0.5;
      }
      save_out_sample = out_sample;

conj_direction_method(&code,&val,vect,3,(function),WN_IHUGE);
      printf("code = %d,val = %lg\n",code,val);
      wn_print_vect(vect,3);

wn_copy_vect(out_sample,vect,3);

bound_out_sample(out_sample);
     } local void renormalize()
     {
```

- 20 -

```
      int i;

make_cube();

      for(i=0;i<NUM_SAMPLES;++i)
      {
      printf("i = %d\n",i);
      renormalize_sample(out[i]);
      }
      } local void read_data_line(px,py,pz)

      double *px,*py,*pz;

{
      int linenum;

      scanf(" %d ) X %lg Y %lg Z %lg\n",&linenum,px,py,pz);
      } local void read_data()
      {
      double in_red,in_green,in_blue,x,y,z;
      int count;

count = 0;
      for(in_blue=0.0;in_blue<1.00001;in_blue+=(1.0/(5.0-1.0)))
      for(in_red=0.0;in_red<1.00001;in_red+=(1.0/(5.0-1.0)))
      for(in_green=0.0;in_green<1.00001;in_green+=(1.0/(5.0-1.0)))
      {
      read_data_line(&x,&y,&z);

in[count][0] = in_red;
      in[count][1] = in_green;
      in[count][2] = in_blue;
```

```
          out[count][0] = x;
          out[count][1] = y;
          out[count][2] = z;
          /*
          out[count][0] = 100.0*in_red;
          out[count][1] = 50.0*in_green;
          out[count][2] = 20.0*in_blue;
          */
          printf("in = (%lg,%lg,%lg), out = (%lg,%lg,%lg)\n",
                 in[count][0],in[count][1],in[count][2],
                 out[count][0],out[count][1],out[count][2]);

          ++count;
        } wn_assert(count == NUM_SAMPLES);

        renormalize();

/*
        */
        wn_swap(in,out,double **);
        for(count=0;count<NUM_SAMPLES;++count)
        {
          printf("(%lf,%lf,%lf) --> (%lf,%lf,%lf)\n",
                 in[count][0],in[count][1],in[count][2],
                 out[count][0],out[count][1],out[count][2]);
        }
      }

      void main()
      {
        extern double wn_random_double_between(),hypot(),atan2(),wn_fmod();
        nnet_type nnet;
        int i;
```

```
    wn_gpmake("no_free");

wn_make_mat(&in,NUM_SAMPLES,3);
    wn_make_mat(&out,NUM_SAMPLES,3);

read_data();

fit_wn_model(out,in,NUM_SAMPLES,WN_IHUGE);
10  }
```

- 23 -

Appendix 2

```
/******************************************************************* physics fitting code

*******************************************************************/ include <math.h>
include <stdio.h>
include <malloc.h> include "wnlib.h"
include "wnabs.h"
#include "wnmax.h"

define NUM_PARAMS   2 local int iteration_count;

static double **save_in;
static double **save_out;
static int save_num_samples;

local void compute_extra_ink(pextra_ink,from)

double *pextra_ink;
double from[3];

{
  double c,m,y,k,ink,max;

c = 1.0-from[0];
    m = 1.0-from[1];
    y = 1.0-from[2];
```

-24-

```
    max = wn_max(c,m);
    max = wn_max(max,y);

if(max == 0.0)
    {
      *pextra_ink = 1.0;
      return;
    }

10  k = wn_min(c,m);
    k = wn_min(k,y);
    /*
    k = 0.0;
    */
    ink = k + (c-k) + (m-k) + (y-k);

*pextra_ink = ink/max;
    /*
    *pextra_ink = ink;
    */
    }

    local void physics_colormap(to,from,c_orig,k,vect)

double from[3],to[3],c_orig,k,vect[NUM_PARAMS];

{
    extern double exp(),log();
    double c,n,y,x,extra_ink;
    int i;

compute_extra_ink(&extra_ink,from);
    c = c_orig*(1.0+k*(extra_ink-1.0));
    /*
    c = c_orig;
    c = vect[0]+vect[1]*extra_ink+vect[2]*extra_ink*extra_ink;
```

- 25 -

```
    */

/*
    printf("c = %lf,extra_ink = %lf\n",c,extra_ink);
    */ n = 1.0-exp(-c);

    for(i=0;i<3;++i)
    {
      y = 1.0-from[i];

x = -log(1.0-n*y)/c;
15
      to[i] = 1.0-x;
    }

/*
    printf("(%lf,%lf,%lf) --> (%lf,%lf,%lf)\n",
            from[0],from[1],from[2],to[0],to[1],to[2]);
    */
    }

    local void eval_func(out,in,vect)

double out[3],in[3],vect[NUM_PARAMS];

    {
      double c_orig,k;

c_orig = vect[0];
      k = vect[1];
      physics_colormap(out,in,c_orig,k,vect);
    }
```

-26-

```
     #if 0
     local void eval_func(out,in,vect)

double out[3],in[3],vect[NUM_PARAMS];
     {
       extern double exp();
       double c,k,x,y;
       int i;
       c = vect[0];

for(i=0;i<3;++i)
       {
         x = 1.0-in[i];

y = (1.0-exp(-c*x))/(1.0-exp(-c));

out[i] = 1.0-y;
20     }
     }
     #endif 25   local double function(vect)

double vect[];

{
       extern double wn_dist2(),sqrt();
       int i;
       double sum;
       double actual_out[3];

       sum = 0.0;

for(i=0;i<save_num_samples;++i)
       {
         eval_func(actual_out,save_in[i],vect);
```

```
            sum += wn_dist2(actual_out,save_out[i],3);
        }

       printf("c = %lg,k = %lg\n",vect[0],vect[1]);
        printf("ob = %lg,ave error = %lg\n",
               sum,sqrt(sum/(save_num_samples*3.0)));
        return(sum);
    }
   if 0
    local void gradient(grad,vect)

    double grad[],vect[];

{
        int i,j;
        double actual_out[3],partials[NUM_PARAMS];
        wn_zero_vect(grad,2);

for(i=0;i<save_num_samples;++i)
        {
            eval_func(actual_out,save_in[i]);

for(j=0;j<3;++j)
            {
                actual_out[j] = 2.0*(actual_out[j]-save_out[i][j]);
            }

/*
            ....
            backward_propagate(save_nnet,actual_out);
            */
        } printf("grad.---------\n");
        printf("iteration_count = %d\n",iteration_count);
```

-28-

```
        fflush(stdout);
        ++iteration_count;
    }
    #endif
  void fit_wn_model(out,in,num_samples,num_iterations)

double **out;
        double **in;
        int num_samples;
        int num_iterations;

{
        extern double wn_normal_distribution();
        double vect[NUM_PARAMS];
        int i,code;
        double val_min;

        wn_gpmake("no_free");

save_in = in;
        save_out = out;
        save_num_samples = num_samples;
        vect[0] = 4.5;
        vect[1] = 1.0/4.0;
        /*
        vect[0] = .5;
30      vect[1] = .75;
        */ iteration_count = 0;

        /*
        conj_gradient_method(&code,&val_min,vect,
                        size,(function),(gradient),num_iterations);
        qn_conj_gradient_method(&code,&val_min,vect,
                        size,(function),(gradient),num_iterations);
```

-29-

```
*/
    powell_method(&code,&val_min,vect,NUM_PARAMS,(function),num_iterations);

printf("code = %d\n",code);
    printf("val_min = %lf\n",val_min);

wn_gpfree();
}
```

-30-

Appendix 3

NAME
    conjdir -- conjugate directions function minimization package

SYNOPSIS
    void conj_direction_method(&code,&val_min,
                            vect,len,pfunction,max_iterations)
    int code;
    double val_min;
    double vect[];
    int len;
    double (*pfunction)(/* vect */);
    int max_iterations;

void conj_gradient_method(&code,&val_min,
                              vect,len,pfunction,pgradient,max_iterations)
    int code;
    double val_min;
    double vect[];
    int len;
    double (*pfunction)(/* vect */);
    void (*pgradient)(/* grad,vect */);
    int max_iterations;

double barrier(x)
    double x;

double dbarrier(x)
    double x;

double penalty(x)
    double x;

double dpenalty(x)
    double x;

DESCRIPTION
    This package is useful for minimizing continuous, differentiable
    functions of many
    variables. The routines assume that the function to minimize is well
    approximated by a quadratic form with a positive definite Hessian.
    For functions which are well approximated this way, convergence rates
    are reasonably predictable. If all goes well, these routines
    converge to a local minimum; this local minimum is not necessarily
    a global minimum or even a good local minimum. If the function
    is not differentiable, the algorithms often get stuck in very sub-optimal solutions, and no warning is given that this has happened.

"conj_direction_method" conducts a conjugate directions search without the need for derivatives of the function to minimize. Consequently, it is the easiest to use, but it runs very slowly for medium-sized and large problems. "code" indicates the status of the completed search. "val_min" is the objective function value at the final solution. "vect" should be loaded with a solution used to begin the search; upon return it contains the final solution. "len" is the number of variables in "vect". "pfunction" is a pointer to the function to minimize. "max_iterations" is the maximum number of iterations allowed; set to WN_IHUGE for no limit.

"conj_gradient_method" conducts a conjugate directions search using derivatives of the function to minimize. Using derivatives usually results in a dramatic speedup, but it makes programming much more complicated. Furthermore, if the derivatives are in error, no warning is given; the result is either very slow convergence or convergence to an incorrect result. The arguments mean the same as the arguments to "conj_direction_method". The additional argument "pgradient" is a pointer to a function which computes the gradient of the function to minimize; that is grad[i] = d function / d vect[i]

Because of the difficulty in ensuring that the derivatives are correct, it is usually best to start by experimenting on a small problem using "conj_direction_method", even if you ultimately intend to use "conj_gradient_method". The solutions obtained from "conj_gradient_method" using derivatives should be similar or the same as solutions obtained from "conj_directions_method" not using derivatives. If this is not so, your derivatives are probably faulty.

"barrier", "dbarrier", "penalty", and "dpenalty" are useful for implementing barrier and penalty methods of non-linear programming.

barrier(x) returns 0 for x <= 0 and infinity for x >= 1. Between 0 and 1, it moves up from 0 to infinity. It is continuous and differentible for all x <= 1.

dbarrier(x) returns the derivative of barrier(x).

penalty(x) returns 0 for x <= 0 and x^2 for x >= 0. It is continuous and differentiable for all x.

dpenalty(x) returns the derivative of penalty(x).

-32-

RESOURCES
   conjugate_direction_method runs with

AVERAGE CASE:

time = len^2 * (len^2 + <time to evaluate function>)
   stack memory = 1
   dynamic memory = len*len conjugate_gradient_method runs with

AVERAGE CASE:

time = len * (2*<time to evaluate function> +
                 <time to evaluate gradien>)
   stack memory = 1
   dynamic memory = len Run time depends heavily on the problem being solved. If the function
   is badly behaved, convergence can take much longer than these times.
   If the function is not too badly behaved and the Hessian has distinct
   eigenvalues, the times given here usually apply. If the eigenvalues
   of the Hessian are not distinct, much faster convergence times are
   possible.

DIAGNOSTICS
   code == WN_SUCCESS means successful completion, optimum found
   code == WN_SUBOPTIMAL means termination before optimum found
   code == WN_UNBOUNDED means function is unbounded

BUGS

SEE ALSO

AUTHOR
   Will Naylor

- 33 -

```
/**************************************************************** void force_optimize_stop()

void minimize_1d(pval_min,px_min,x_start,pfunction)
    void conj_direction_method(pcode,pval_min,vect,len,pfunction,max_iterations)

*****************************************************************/ include <stdio.h>
include <math.h> include "wnlib.h"
include "wnswap.h"

#include "wnmat.h"

#define TOLERANCE        (1.0e-13)
#define ROOT_TOLERANCE   (1.0e-7)
/*
#define TOLERANCE        (1.0e-13)
#define ROOT_TOLERANCE   (1.0e-7)
#define TOLERANCE        (1.0e-16)
#define ROOT_TOLERANCE   (1.0e-8)
#define TOLERANCE        (1.0e-20)
#define ROOT_TOLERANCE   (1.0e-10)
#define TOLERANCE        (1.0e-15)
#define ROOT_TOLERANCE   (3.3e-8)
*/
#define GOLDEN_RATIO       1.618034
#define GOLDEN_SECTION     0.3819660
#define MAX_MAGNIFICATION  100.0
define MAX_BRENT_ITERATIONS 200 define SHIFT3(_x1,_x2,_x3) {(_x1)=(_x2); (_x2)=(_x3);}
define SHIFT4(_x1,_x2,_x3,_x4) {SHIFT3(_x1,_x2,_x3); (_x3)=(_x4);}
```

- 34 -

```
    bool force_optimize_stop_flag = FALSE;

    void force_optimize_stop()
    {
      force_optimize_stop_flag = TRUE;
    }
   local double max(x,y)

double x,y;
    {
      if(x > = y)
      {
        return(x);
20    }
      else
      {
        return(y);
      }
25  } local double min(x,y)

30  double x,y;

{
      if(x < = y)
      {
        return(x);
      }
      else
      {
        return(y);
```

```
    }
} local double inherit_sign(a,b)

double a,b;

{
      if(b > 0.0)
        {
          return(fabs(a));
        }
      else
        {
          return(-fabs(a));
        }
    }

/* assume *pfa,*pfb,*pfc already computed */
local void bracket_minimum(pax,pbx,pcx,pfa,pfb,pfc,pfunction)

double *pax,*pbx,*pcx,*pfa,*pfb,*pfc;
    double (*pfunction)(/*double x*/);

{
      double ulim,u,r,q,fu;

if(*pfc > *pfa)
        {
          wn_swap(*pfa,*pfc,double);
          wn_swap(*pax,*pcx,double);
        } while((*pfb > *pfc)&¬(force_optimize_stop_flag))
        {
          r = (*pbx-*pax)*(*pfb-*pfc);
          q = (*pbx-*pcx)*(*pfb-*pfa);
```

-36-

```
    u = (*pbx)-((*pbx-*pcx)*q-(*pbx-*pax)*r)/
        (2.0*inherit_sign(max(fabs(q-r),TOLERANCE),q-r));
    ulim = (*pbx)+MAX_MAGNIFICATION*(*pcx-*pbx);

    if((*pbx-u)*(u-*pcx) > 0.0)
    {
      fu = (*pfunction)(u);
      if(fu < *pfc)
      {
        *pax = *pbx;
        *pbx = u;
        *pfa = *pfb;
        *pfb = fu;
        return;
      }
      else if(fu > *pfb)
      {
        *pcx = u;
        *pfc = fu;
        return;
      }
      u = (*pcx)+GOLDEN_RATIO*(*pcx-*pbx);
      fu = (*pfunction)(u);
    }
    else if((*pcx - u)*(u-ulim) > 0.0)
    {
      fu = (*pfunction)(u);
      if(fu < *pfc)
      {
        SHIFT4(*pbx,*pcx,u,*pcx+GOLDEN_RATIO*(*pcx - *pbx));
        SHIFT4(*pfb,*pfc,fu,(*pfunction)(u));
      }
    }
    else if((u-ulim)*(ulim-*pcx) >= 0.0)
    {
      u = ulim;
      fu = (*pfunction)(u);
    }
    else
```

- 37 -

```
        {
          u = (*pcx)+GOLDEN_RATIO*(*pcx-*pbx);
          fu = (*pfunction)(u);
        }
        SHIFT4(*pax,*pbx,*pcx,u);
        SHIFT4(*pfa,*pfb,*pfc,fu);
      }
    }

/* assume *pfa,*pfb,*pfc already computed */
    local void brent_method(pax,pbx,pcx,pfa,pfb,pfc,pfunction)

    double *pax,*pbx,*pcx,*pfa,*pfb,*pfc;
    double (*pfunction)(/*double x*/);

{
      int iterations;
      double d,fu,fv,fw,p,q,r,tol1,tol2,u,v,w,xm,
             e,etemp;

if(force_optimize_stop_flag)
      {
        force_optimize_stop_flag = FALSE;
        return;
      } if(*pax > *pcx)
      {
        wn_swap(*pax,*pcx,double);
        wn_swap(*pfa,*pfc,double);
      }

      wn_assert(*pax < *pbx);
      wn_assert(*pbx < *pcx);
      wn_assert(*pfb <= *pfa);
      wn_assert(*pfb <= *pfc);
```

-38-

```
     e = d = WN_FHUGE;

v = *pax;
     fv = *pfa;
     w = *pcx;
     fw = *pfc;

for(iterations=0;(iterations<MAX_BRENT_ITERATIONS)&¬(force_optimize_sto
     p_flag);
         ++iterations)
     {
       xm = 0.5*(*pax + *pcx);
       tol1 = ROOT_TOLERANCE*fabs(*pbx)+ROOT_TOLERANCE;
       tol2 = 2.0*tol1;
       if(fabs(*pbx - xm) <= (tol2-0.5*(*pcx - *pax)))
       {
         return;
       }
       if(fabs(e) > tol1)
       {
         r = (*pbx - w)*(*pfb - fv);
         q = (*pbx - v)*(*pfb - fw);
         p = (*pbx - v)*q - (*pbx - w)*r;
         q = 2.0*(q-r);
         if(q > 0.0)
         {
            p = -p;
         }
         q = fabs(q);
         etemp = e;
         e = d;
         if(
             (fabs(p) >= fabs(0.5*q*etemp))
             ||
             (p <= q*(*pax - *pbx))
             ||
             (p >= q*(*pcx - *pbx))
           )
```

```
            {
                e = (*pbx >= xm)?(*pax - *pbx):(*pcx - *pbx);
                d = GOLDEN_SECTION*e;
            }
        else
            {
                d = p/q;
                u = *pbx + d;
                if(((u - *pax) < tol2)||(((*pcx - u) < tol2))
                {
                    d = inherit_sign(tol1,xm - *pbx);
                }
            }
        }
        else
        {
            e = (*pbx >= xm)?(*pax - *pbx):(*pcx - *pbx);
            d = GOLDEN_SECTION*e;
        }
        u = ((fabs(d) >= tol1)?(*pbx + d):(*pbx + inherit_sign(tol1,d)));
        fu = (*pfunction)(u);
        if(fu <= *pfb)
        {
            if(u >= *pbx)
            {
                *pax = *pbx;
            }
            else
            {
                *pcx = *pbx;
            }
            SHIFT4(v,w,*pbx,u);
            SHIFT4(fv,fw,*pfb,fu);
        }
        else
        {
            if(u < *pbx)
            {
                *pax = u;
```

-40-

```
            }
        else
        {
            *pcx = u;
        }
        if((fu <= fw)||(w == *pbx))
        {
            SHIFT3(v,w,u);
            SHIFT3(fv,fw,fu);
        }
        else if((fu <= fv)||(v == *pbx)||(v == w))
        {
            v = u;
            fv = fu;
15      }
      }
    } force_optimize_stop_flag = FALSE;
    fprintf(stderr,"brent_method: too many iterations.\n");
    }

/* assume *pfa,*pfb,*pfc already computed */
    local void minimize_1d_raw(pax,pbx,pcx,pfa,pfb,pfc,pfunction)

double *pax,*pbx,*pcx,*pfa,*pfb,*pfc;
    double (*pfunction)(/*double x*/);

    {
        bracket_minimum(pax,pbx,pcx,pfa,pfb,pfc,pfunction);
        brent_method(pax,pbx,pcx,pfa,pfb,pfc,pfunction);
    }

    void minimize_1d(pval_min,px_min,x_start,pfunction)

double *pval_min,*px_min,x_start;
    double (*pfunction)(/*double x*/);
```

```
    {
      double ax,bx,cx,fa,fb,fc;

     force_optimize_stop_flag = FALSE;

ax = x_start;
      bx = x_start+0.5;
      cx = x_start+1.0;
      fa = (*pfunction)(ax);
      fb = (*pfunction)(bx);
      fc = (*pfunction)(cx);

minimize_1d_raw(&ax,&bx,&cx,&fa,&fb,&fc,pfunction);
      *pval_min = fb;
      *px_min = bx;
    }

    local void initialize_powell_directions(xi,len)

double **xi;
    int len;
    {
      int i;

wn_zero_mat(xi,len,len);
30
      for(i=0;i<len;++i)
      {
        xi[i][i] = 1.0;
      }
    } local int save_len;
    local double *buffer_vect,*save_vect,*save_direction;
```

- 42 -

```
    local double (*save_pfunction)(/*double vect[]*/);

local double powell_line_function(x)
    double x;

{
       wn_copy_vect(save_vect,buffer_vect,save_len);
       wn_add_scaled_vect(save_vect,save_direction,x,save_len);

return((*save_pfunction)(save_vect));
    }

    local void powell_line_minimize(vect,direction,len,pval_min,pfunction)

double vect[],direction[];
    int len;
    double *pval_min;
    double (*pfunction)(/*double vect[]*/);

{
       double ax,bx,cx,fa,fb,fc;
       wn_copy_vect(buffer_vect,vect,len);
       save_vect = vect;
       save_len = len;
       save_direction = direction;
       save_pfunction = pfunction;

ax = 0.0;
       bx = 0.5;
       cx = 1.0;
       fa = *pval_min;
       fb = powell_line_function(bx);
       fc = powell_line_function(cx);

minimize_1d_raw(&ax,&bx,&cx,&fa,&fb,&fc,(powell_line_function));
```

```
        /*
        printf("l = %lf\n",bx);
        */

        wn_copy_vect(vect,buffer_vect,len);
        wn_add_scaled_vect(vect,direction,bx,len);

*pval_min = fb;
        }
   local double square(x)

double x;
        {
          return(x*x);
        }

        void conj_direction_method(pcode,pval_min,vect,len,pfunction,max_iterations)

int *pcode;
        double *pval_min;
        double vect[];
        int len;
        double (*pfunction)(/*double vect[]*/);
        int max_iterations;

        {
          int i,ibig,j,iteration;
          double t,fptt,fp,del;
          double *pt,*ptt,*xit;
          double **xi;
          force_optimize_stop_flag = FALSE;

wn_gpmake("no_free");
```

- 44 -

```
    wn_make_vect(&buffer_vect,len);
    wn_make_mat(&xi,len,len);
    wn_make_vect(&pt,len);
    wn_make_vect(&ptt,len);
    wn_make_vect(&xit,len);

initialize_powell_directions(xi,len);

*pval_min = (*pfunction)(vect);
    wn_copy_vect(pt,vect,len);

iteration = 0;

    for(iteration=0;;++iteration)
    {
      fp = *pval_min;
      del = 0.0
      for(i=0;i<len;++i)
      {
        fptt = *pval_min;
        powell_line_minimize(vect,xi[i],len,pval_min,pfunction);
        if(fabs(fptt-(*pval_min)) > del)
        {
          del = fabs(fptt-(*pval_min));
          ibig = i;
        }
      }
      if(2.0*fabs(fp-(*pval_min)) <= TOLERANCE*(fabs(fp)+fabs(*pval_min)))
      {
        *pcode = WN_SUCCESS;
        force_optimize_stop_flag = FALSE;
        wn_gpfree();
        return;
      }
      if(
          force_optimize_stop_flag
            ||
          ((iteration >= max_iterations)&&(max_iterations < WN_IHUGE))
```

```
            )
            {
              *pcode = WN_SUBOPTIMAL;
              force_optimize_stop_flag = FALSE;
              wn_gpfree();
              return;
            }
            for(j=0;j<len;++j)
            {
              ptt[j] = 2.0*vect[j]-pt[j];
              xit[j] = vect[j]-pt[j];
            }
            wn_copy_vect(pt,vect,len);
            fptt = (*pfunction)(ptt);
            if(fptt < fp)
            {
              t = 2.0*(fp-2.0*(*pval_min)+fptt)*square(fp-(*pval_min)-del) -
                  del*square(fp-fptt);
              if(t < 0.0)
              {
                powell_line_minimize(vect,xit,len,pval_min,pfunction);
                wn_copy_vect(xi[ibig],xit,len);
              }
            }
25        }
          }
```

- 46 -

```
/***************************************************************** void conj_gradient_method(pcode,pval_min,vect,
                      len,pfunction,pgradient,max_iterations)

*****************************************************************/
include <stdio.h>
include <math.h> include "wnlib.h"
include "wnmat.h"
#include "wnswap.h"
#include "wnabs.h"

#define GOLDEN_RATIO      1.618034
#define GOLDEN_SECTION    0.3819660
define MAX_SEARCH_ITERATIONS  100 extern bool force_optimize_stop_flag;

local double *buffer_vect;

/*****************************************************************
  Fit parabola to 3 points (x,y).  Parabola is of the form y = a*(x-x0)^2 + b Return a, x0, b.
*****************************************************************/
local void fit_parabola_3p(pa,px0,pb,x1,x2,x3,y1,y2,y3)
```

```
    double *pa,*px0,*pb;
    double x1,x2,x3,
           y1,y2,y3;

    {
      double x12,x23,dy12,dy23,ddy,diff;

/* sort the x's */
      if(not(x1 < x3))
      {
        wn_swap(x1,x3,double);
        wn_swap(y1,y3,double);
      }
      if(x2 < x1)
      {
        wn_swap(x1,x2,double);
        wn_swap(y1,y2,double);
      }
      else if(x3 < x2)
      {
        wn_swap(x2,x3,double);
        wn_swap(y2,y3,double);
      }

      wn_assert(x1 != x2);
      wn_assert(x2 != x3);

x12 = 0.5*(x1+x2);
      x23 = 0.5*(x2+x3);
      dy12 = (y2-y1)/(x2-x1);
      dy23 = (y3-y2)/(x3-x2);

ddy = dy23-dy12;
      *pa = 0.5*ddy/(x23-x12);

if(ddy == 0.0)
      {
        *px0 = 0.0;
```

```
        *pb = y2;
      }
      else
      {
        *px0 = (dy23*x12-dy12*x23)/ddy;

diff = x2-(*px0);
        *pb = y2-(*pa)*diff*diff;
      }
    }

/*************************************************************
       Fit parabola to 2 points (x,y) and a derivative at one point.
       Parabola is of the form y = a(x-x0)^2 + b Return a, x0, b.
    *************************************************************/
    local void fit_parabola_2pd(pa,px0,pb,x1,x2,y1,dy1,y2)

double *pa,*px0,*pb;
    double x1,x2,
           y1,dy1,y2;

{
      double x12,dy12,ddy,diff;

      wn_assert(x1 != x2);

x12 = 0.5*(x1+x2);

dy12 = (y2-y1)/(x2-x1);
      ddy = dy12-dy1;
      *pa = 0.5*ddy/(x12-x1);

if(ddy == 0.0)
```

```
        {
          *px0 = 0.0;
          *pb = y1;
        }
        else
        {
          *px0 = (dy12*x1-dy1*x12)/ddy;

diff = x1-(*px0);
          *pb = y1-(*pa)*diff*diff;
        }
      }

      local bool vects_equal(v1,v2,len)

double v1[],v2[];
      int len;

      {
        int i;

for(i=0;i<len;++i)
        {
25        if(v1[i] != v2[i])
          {
            return(FALSE);
          }
        }
30      return(TRUE);
      }

      local void eval_function(pval,vect,direction,x,len,pfunction)

double *pval;
      double vect[],direction[];
      double x;
```

-50-

```
      int len;
      double (*pfunction)(/*double vect[]*/);

{
        wn_add_vect_and_scaled_vect(buffer_vect,vect,direction,x,len);

*pval = (*pfunction)(buffer_vect);
      }

      local void line_minimize(pval,pjump_len,
                               vect,
                               direction,last_val,last_g,last_jump_len,len,pfunction)

      double *pval,*pjump_len;
      double vect[];
      double direction[];
      double last_val;
      double last_g[];
      double last_jump_len;
      int len;
      double (*pfunction)(/*double vect[]*/);

{
        extern double wn_dot_vects(),wn_random_double_between();
        double a,x0,y0,b,dy1,y2,x3,y3,last_x3,last_y3;
        int iteration_count;

dy1 = wn_dot_vects(direction,last_g,len);
        last_jump_len = -wn_sign(dy1)*wn_abs(last_jump_len);

eval_function(&y2,vect,direction,last_jump_len,len,pfunction);

fit_parabola_2pd(&a,&x0,&b,0.0,last_jump_len,last_val,dy1,y2);
        if(a > 0.0)
        {
          eval_function(&y0,vect,direction,x0,len,pfunction);
```

```
        if((y0 < last_val)&&(y0 <= y2))  /* parabolic fit succeeded */
        {
          *pval = y0;
          *pjump_len = x0;
          wn_add_scaled_vect(vect,direction,x0,len);

return;
        }
      }

/* parabolic fit failed */ x3 = last_jump_len;
      y3 = y2;

if(y2 >= last_val)
      {
        /* project inward */ iteration_count = 0;

do
        {
          /*
          x3 *= GOLDEN_SECTION;
          */
          x3 *= (GOLDEN_SECTION*wn_random_double_between(0.9,1.1));
          /*
          eval_function(&y3,vect,direction,x3,len,pfunction);
          */
          wn_add_vect_and_scaled_vect(buffer_vect,vect,direction,x3,len);

if(vects_equal(buffer_vect,vect,len))
          {
            break;
          } y3 = (*pfunction)(buffer_vect);
```

-52-

```
      ++iteration_count;
    }
    while((y3 >= last_val)&&(x3 != 0.0)&&
        (iteration_count < MAX_SEARCH_ITERATIONS));

if(y3 < last_val)
    {
      *pval = y3;
      *pjump_len = x3;
      wn_add_scaled_vect(vect,direction,x3,len);

return;
    }
    if(y2 > last_val)
    {
      *pval = last_val;
      *pjump_len = 0.0;

return;
    }
  }

/* project outward */ x3 = last_jump_len;
  y3 = y2;

iteration_count = 0;

do
  {
    last_x3 = x3;
    last_y3 = y3;

/*
    x3 *= GOLDEN_RATIO;
    */
    x3 *= (GOLDEN_RATIO*wn_random_double_between(0.9,1.1));
    eval_function(&y3,vect,direction,x3,len,pfunction);
```

```
        ++iteration_count;
    }
    while((y3 <= last_y3)&&(y3 <= last_val)&&
          (iteration_count < MAX_SEARCH_ITERATIONS));

*pval = last_y3;
    *pjump_len = last_x3;
    wn_add_scaled_vect(vect,direction,last_x3,len);
10
    return;
}

15  void conj_gradient_method(pcode,pval_min,vect,
                              len,pfunction,pgradient,max_iterations)

int *pcode;
    double *pval_min;
    double vect[];
    int len;
    double (*pfunction)(/*double vect[]*/);
    void (*pgradient)(/*double grad[],double vect[]*/);
    int max_iterations;
{
    extern double wn_normal_distribution();
    extern double wn_norm2(),wn_norm(),wn_dot_vects();
    int j,iteration,no_move_count;
    double norm2_g,norm2_last_g,val,last_val,numerator,beta,
           jump_len,last_jump_len;
    double *g,*last_g,*direction;

wn_gpmake("no_free");
    force_optimize_stop_flag = FALSE;

wn_make_vect(&buffer_vect,len);
    /*
```

-54-

```
    wn_make_vect(&g,len);
    */
    g = buffer_vect;  /* share memory with buffer_vect */
    wn_make_vect(&last_g,len);
    wn_make_vect(&direction,len);

jump_len = 1.0;
    no_move_count = 0;

    val = (*pfunction)(vect);
    (*pgradient)(g,vect);

wn_copy_vect(direction,g,len);

    for(iteration=0;iteration<max_iterations;++iteration)
    {
      norm2_g = wn_norm2(g,len);

if(norm2_g == 0.0)   /* unlikely */
      {
        wn_gpfree();
        *pval_min = val;
        *pcode = WN_SUCCESS;
        return;
      } last_jump_len = jump_len;
      last_val = val;
      wn_copy_vect(last_g,g,len);
      norm2_last_g = norm2_g;

line_minimize(&val,&jump_len,
                    vect,
                    direction,last_val,last_g,last_jump_len,len,pfunction);
      if(force_optimize_stop_flag)
      {
        force_optimize_stop_flag = FALSE;
        wn_gpfree();
```

```
              *pval_min = val;
              *pcode = WN_SUBOPTIMAL;
              return;
           }
        wn_assert(val <= last_val);
        if(val == last_val)
        {
           if(no_move_count >= 2)
           {
              wn_gpfree();
              *pval_min = val;
              *pcode = WN_SUCCESS;
              return;
           }
           else
           {
              ++no_move_count;
              jump_len = last_jump_len;
           }
        }
        else
        {
           no_move_count = 0;
        }

(*pgradient)(g,vect);

numerator = 0.0;
        for(j=0;j<len;++j)
        {
           /*
           numerator += g[j]*g[j];
           */
           numerator += g[j]*(g[j]-last_g[j]);
        } beta = numerator/norm2_last_g;
```

```
        /*
        wn_copy_vect(direction,g,len);
        */
        wn_add_vect_and_scaled_vect(direction,g,direction,beta,len);
        /*
        printf("ob = %lg,beta =
        %lg,numerator = %lg,denom = %lg,norm2(direction) = %lg\n",
                val,beta,numerator,norm2_last_g,wn_norm2(direction));
        printf("iteration = %d,ob = %lg\n",iteration,val);
        */
    } wn_gpfree();
    *pval_min = val;
    *pcode = WN_SUBOPTIMAL;
}
```

- 57 -

```
/************************************************************* double barrier(x)
    double dbarrier(x)

double penalty(x)
    double dpenalty(x)

    *************************************************************/
    #include <stdio.h>
    #include <math.h> include "wnlib.h"
15 double barrier(x)

20  double x;

{
     if(x <= 0.0)
     {
25    return(0.0);
     }
     else if(x >= 1.0)
     {
      return(WN_FHUGE);
30   }
     else
     {
      return(1.0/(1.0-x*x)-1.0);
     }
35  } double dbarrier(x)
```

-58-

```
    double x;

{
     if(x <= 0.0)
 5   {
      return(0.0);
     }
     else if(x >= 1.0)
     {
      return(WN_FHUGE);
     }
     else
     {
      double diff;
      diff = 1.0-x*x;

return(2.0*x/(diff*diff));
     }
    } double penalty(x)

25  double x;

{
     if(x <= 0.0)
     {
30    return(0.0);
     }
     else
     {
      return(x*x);
35   }
    } double dpenalty(x)
```

```
     double x;

{
5      if(x <= 0.0)
       {
         return(0.0);
       }
       else
       {
         return(2.0*x);
       }
     }
```

I claim:

1. A method of displaying colour images, intended to be displayed on a first colour display device, on a second colour display device having a colour gamut different from the first colour display device, said method including the steps of:
   (a) determining a plurality of input extrema colour values, within the colour gamut of said first colour display device and at the extrema of the gamut of said first colour display;
   (b) determining a plurality of output extrema colour values corresponding to said input extreme colour values, within the colour gamut of said second colour display and at the extrema of the gamut of said second colour display; and
   (c) determining a mapping for substantially all the values within the colour gamut of the first colour display to substantially all the values within the gamut of the second colour display, said mapping substantially preserving the relative value of differences between colour values relative to the extent of the gamut of said first colour space and differences between corresponding colour values in the gamut of said second colour space relative to the extent of the gamut of said second colour space;
   wherein said mapping includes determining a colour correction function mapping colour gamut values within the gamut of said second colour display to colour gamut values within the colour gamut of said first colour display, and said colour correction function includes a number of free parameters, the values of which are determined by measurement of output colour values of said second colour display device.

2. A method of displaying colour images as claimed in claim 1 wherein said measurements are determined by a colourimeter.

3. A method of displaying colour images as claimed in claim 1 wherein said measurements are made in an alternative colour space and converted to the colour space of said colour gamut of said second colour display device.

4. A method of displaying colour images as claimed in claim 3 wherein said conversion utilising a predetermined number of said output extrema values to determine said conversion.

5. A method of displaying colour images as claimed in claim 4 wherein said conversion includes utilising a barrier function to ensure that said converted measurements are within the colour gamut of said second colour display device.

6. A method of displaying colour images, intended to be displayed on a first colour display device, on a second colour display device having a colour gamut different from the first colour display device, said method including the steps of:
   (a) determining a plurality of input extrema colour values, within the colour gamut of said first colour display device and at the extrema of the gamut of said first colour display;
   (b) determining a plurality of output extrema colour values corresponding to said input extreme colour values, within the colour gamut of said second colour display and at the extrema of the gamut of said second colour display; and
   (c) determining a mapping for substantially all the values within the colour gamut of the first colour display to substantially all the values within the gamut of the second colour display, said mapping substantially preserving the relative value of differences between colour values relative to the extent of the gamut of said first colour space and differences between corresponding colour values in the gamut of said second colour space relative to the extent of the gamut of said second colour space,
   wherein said mapping includes determining a colour correction function mapping colour gamut values within the gamut of said second colour display to colour gamut values within the colour gamut of said first colour display device, and
   wherein said colour correction function is substantially of the form:

$$I = -\ln(1-(1-e^{-G})C)/G$$

where C is a colour value within the colour gamut of said second colour display, G is a predetermined value or a predetermined function, and I is the corresponding colour within the gamut of said first colour display device.

7. A method of displaying colour images as claimed in claim 6 wherein said colour correction function is applied separately for each colour component of said second colour display device.

8. A method of displaying colour images as claimed in claim 7 wherein said second colour display device is an ink printing device and G is a function of the amount of ink currently printed by said second colour display device.

9. A method of displaying colour images as claimed in claim 8 wherein G is of the form:

$$G(ink) = g_0 + g_1 \cdot ink$$

where $g_0$ and $g_1$ are constants determined from measurement of output colour values of said second colour display and "ink" is an approximation of the amount of ink printed at a present pixel position of said image.

10. A method of displaying colour images as claimed in claim 9 wherein said measurements are determined by a colourimeter.

11. A method of displaying colour images as claimed in claim 9 wherein said measurements are made in an alternative colour space and converted to the colour space of said colour gamut of said second colour display device.

12. A method of displaying colour images as claimed in claim 11 wherein said conversion includes utilizing a predetermined number of said output extrema values to determine said conversion.

13. A method of displaying colour images as claimed in claim 12 wherein said conversion includes utilizing a barrier function to ensure that said converted measurements are within the colour gamut of said second colour display device.

14. A method of displaying colour images, intended to be displayed on a first colour display device, on a second colour display device having a colour gamut different from the first colour device, and of correcting any distortion caused by the display of the images on the second colour device, said method including the steps of:
   (a) defining a colour correction function, wherein the colour correction function is representative of an inverse of the distortion and has a number of unknown free input parameters;
   (b) measuring a plurality of output colour values of said second colour display device corresponding to a plurality of input colour values; and (c) determining the unknown free input parameters of the colour correction function by utilizing the measured output colour values of the second display device and the corresponding input color values.

15. A method of displaying colour images as claimed in claim 14, wherein the measurements are determined by a colourimeter.

16. A method of displaying colour images as claimed in claim 14, wherein the measurements are made in an alternative colour space and converted to the colour space of said colour gamut of said second colour display device.

17. A method of displaying colour images as claimed in claim 16 wherein the conversion utilizes a predetermined number of said output extrema values to determine the conversion.

18. A method of displaying colour images as claimed in claim 17 wherein the conversion includes utilizing a barrier function to ensure that said converted measurements are within the colour gamut of said second colour display device.

19. A method of displaying colour images as claimed in claim 14 wherein said colour correction function is substantially of the form:

$$I = -\ln(1-(1-e^{-G})C)/G$$

where C is a colour value within the colour gamut of said second colour display, G is a predetermined value or a predetermined function, and I is the corresponding colour within the gamut of said first colour display device.

20. A method of displaying colour images as claimed in claim 19 wherein said colour correction function is applied separately for each colour component of said second colour display device.

21. A method of displaying colour images as claimed in claim 20 wherein said second colour display device is an ink printing device and G is a function of the amount of ink currently printed by said second colour display device.

22. A method of displaying colour images as claimed in claim 21 wherein G is of the form:

$$G(\text{ink}) = g_0 + g_1 \times \text{ink}$$

where $g_0$ and $g_1$ are constants determined from measurement of output colour values of said second colour display and "ink" is an approximation of the amount of ink printed at a present pixel position of said image.

* * * * *

UNITED STATES PATENT AND TRADEMARK OFFICE
CERTIFICATE OF CORRECTION

PATENT NO. : 5,801,854

DATED : September 1, 1998

INVENTOR(S): WILLIAM CLARK NAYLOR, JR.

It is certified that error appears in the above-identified patent and that said Letters Patent is hereby corrected as shown below:

COLUMN 1:

Line 33, "know" should read --known--.

COLUMN 2:

Line 19, "ence" should read --ences--.

COLUMN 4:

Line 36, "FIG. 7" should read --FIG. 7,--; and
    Line 55, "presents" should read --represents--.

COLUMN 5:

Line 21, "XYZ," should read --XYZ;--.

UNITED STATES PATENT AND TRADEMARK OFFICE
CERTIFICATE OF CORRECTION

PATENT NO. : 5,801,854

DATED : September 1, 1998

INVENTOR(S) : WILLIAM CLARK NAYLOR, JR.

It is certified that error appears in the above-identified patent and that said Letters Patent is hereby corrected as shown below:

COLUMN 7:

Line 6, "functions" should read --function--; and
    Equation 12, "points;" should read --points i--.

COLUMN 8:

Line 58, "principal" should read --principle--;
    Line 59, "ejection" should read --ejecting--; and
    Line 64, "uniformed" should read --uniform--.

COLUMN 9:

Line 47, "examples" should read --example --.

Signed and Sealed this

Twenty-ninth Day of June, 1999

*Attest:*

Q. TODD DICKINSON

*Attesting Officer*     *Acting Commissioner of Patents and Trademarks*